United States Patent [19]

Hunt

[11] 4,192,398

[45] Mar. 11, 1980

[54] ACTUATOR MECHANISM INCORPORATING SCREW-AND-NUT DEVICES

[75] Inventor: Norman Hunt, Leamington Spa, England

[73] Assignee: Associated Engineering Limited, London, England

[21] Appl. No.: 900,239

[22] Filed: Apr. 26, 1978

[51] Int. Cl.² ............... B60K 27/00; F02D 11/10; H01H 3/16

[52] U.S. Cl. ............................. 180/178; 123/102; 200/47

[58] Field of Search ........... 123/103 C, 97 R, 102; 192/141; 200/153 P, 47, 153 T; 180/105 E

[56] References Cited

U.S. PATENT DOCUMENTS

| | | | |
|---|---|---|---|
| 537,856 | 4/1895 | Roberts | 200/47 |
| 1,537,774 | 5/1925 | Kalbach | 200/47 |
| 1,970,069 | 8/1934 | Whitlock | 200/47 |
| 2,276,740 | 3/1942 | Saito | 200/47 |
| 2,944,436 | 7/1960 | Pickles | 192/141 |
| 2,964,601 | 12/1960 | Stockwell | 200/153 T |
| 3,029,660 | 4/1962 | Sears | 192/141 |
| 3,338,225 | 8/1967 | Nicholson | 123/102 |
| 3,767,972 | 10/1973 | Noddings | 180/105 E |
| 3,851,125 | 11/1974 | Deming | 200/47 |

FOREIGN PATENT DOCUMENTS

| | | | |
|---|---|---|---|
| 959528 | 12/1974 | Canada | 200/47 |
| 726152 | 9/1952 | United Kingdom | 74/424.8 |

Primary Examiner—Charles J. Myhre
Assistant Examiner—Carl Stuart Miller
Attorney, Agent, or Firm—Biebel, French & Nauman

[57] ABSTRACT

The invention relates to a mechanism for actuating the carburetor throttle or fuel injection pump rack of an internal combustion engine. The mechanism comprises a ball screw device including an axially fixed nut rotatable by a reversible electric motor to axially reciprocate a screw concentrically within the nut and connected to the engine throttle or rack. Within and axially fixed relative to the nut is a caged ball arrangement which, when the cage is allowed to rotate, couples the nut to the screw to produce said axial displacement, but when the cage is blocked against rotation, causes the nut to freewheel. Stops carried by the screw are provided to engage and block the cage at each end of the axial travel of the screw to determine the stroke length thereof, and limit switches are provided actuated at each end of the stroke, to reverse the motor. One of the stops is operable to simultaneously block the cage and actuate the associated limit switch, this stop also being axially adjustable thereby to adjust the length of the stroke of the screw.

6 Claims, 5 Drawing Figures

ACTUATOR MECHANISM INCORPORATING SCREW-AND-NUT DEVICES

The present invention relates to actuator mechanisms incorporating screw-and-nut devices.

Such mechanisms may be used in speed control systems to actuate the throttle of the carburettor, or the rack of the fuel injection pump, of an internal combustion engine. The travel of the throttle or fuel injection rack will differ with different applications, and it is desirable to use a standard screw-and-nut device which is adjustable to suit the different travel associated with different applications.

The screw-and-nut device of the actuator mechanism is driven by an electric motor in accordance with signals from an electronic circuit, which drive the motor in the direction to close the throttle or reduce the fuel supply when the actual speed is greater than the required speed, and vice versa.

According to the present invention there is provided an actuator mechanism, comprising a screw-and-nut device including a nut member, a screw member concentrically within the nut member, one of the members being adapted to be rotatably driven by a reversible electric motor, a series of balls, a cage between the nut member and screw member and accommodating the balls, the cage having oppositely directed walls at its ends, extending in the general direction of the axis of rotation of the rotatable member, the balls cooperating with the cage, nut member and screw member so that rotation of the rotatable member produces generally axial displacement of the other member via the balls during rotation of the cage relative to the other member, whilst rotation of the rotatable member produces no axial displacement of the other member when the cage is prevented from rotating relative to the other member, the actuator mechanism further comprising a limit switch positioned in axially stationary relation with said other member, abutment means axially displaceable with the other member, adjustable relative thereto, and arranged to engage a wall at one end of the cage, thereby to prevent rotation of the cage and thus prevent axial displacement of the other member, substantially simultaneously with actuating the limit switch, at one end of the axial travel of the other member, a further switch associated with the other end of the axial travel of the other member, means arranged to engage a wall at the other end of the cage, thereby to prevent rotation of the cage and axial displacement of the other member at the other end of the axial travel of the other member, the other member being adapted to be connected to a displaceable control device of an engine to effect displacement of the control device, and the abutment means being adjustable axially relative to the other member to adjust the extent of the axial travel of the latter to suit engine control devices having differing amounts of travel.

One embodiment of actuator mechanism in accordance with the invention will now be described by way of example with reference to the accompanying drawings, in which.

Figure 1:
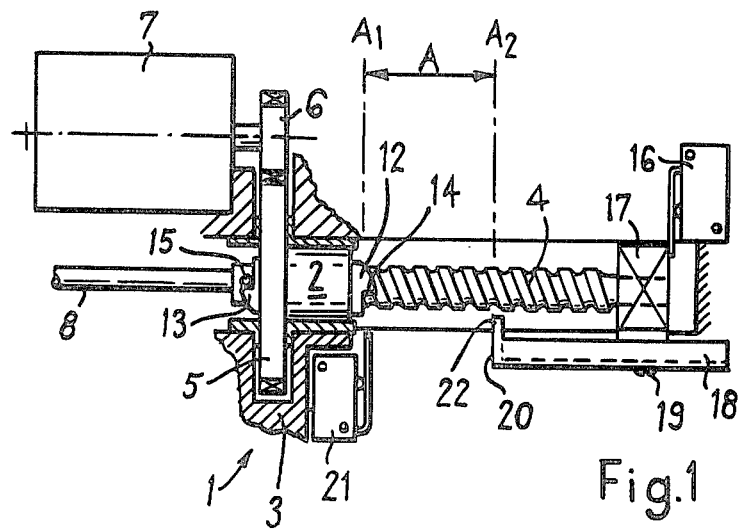
FIG. 1 is a diagrammatic fragmentary side elevation of the actuator mechanism, partly in section.

The actuator mechanism indicated generally at 1 in FIG. 1 incorporates a screw-and-nut device including a nut 2, mounted for rotational but not axial movement in a housing 3, and a screw 4 cooperating with the nut 2, and mounted for axial but not rotational movement in the housing 3.

Figure 5:
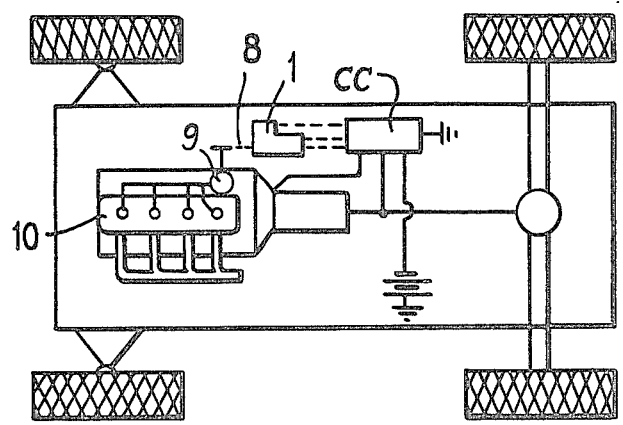
FIG. 5 is a schematic representation of a road vehicle fitted with a speed control system incorporating a mechanism as shown in FIGS. 1 to 4.

The nut is driven through gears 5, 6 by reversible electric motor 7, and rotation of the nut 2 causes axial travel of the screw 4 between its end positions. (In FIG. 1, the screw is shown in its right-hand end position). The screw 4 is connected to a rod, cable or other suitable linkage 8 which, as indicated in FIG. 5 is suitably connected to the carburettor throttle, fuel injection pump rack or other speed control device or mechanism 9 of the vehicle engine 10.

The arrangement is such that, when an electronic control circuit CC (FIG. 5), which detects various variable operating parameters or conditions of the engine and/or vehicle, detects that the actual speed of the vehicle or engine is in excess of a selected speed programmed into the control circuit CC, the latter causes the reversible motor 7 to rotate the nut 2 through gears 5 and 6 in the direction to cause axial travel of the screw 4 to move the rod 8 in the direction to move the control system in the sense to reduce the engine speed. Moreover, if the electronic control circuit senses that the actual speed is below the desired selected speed, the motor 7 may be caused to drive the nut and screw in the opposite sense, so as to move the control mechanism 9 in the sense to increase the actual speed.

Figure 2:
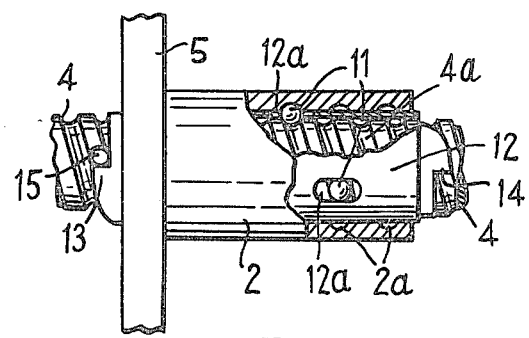
FIG. 2 is a side elevation, on an enlarged scale and with parts broken away, of one form of screw-and-nut device which may be incorporated in the mechanism of FIG. 1.

The screw-and-nut device shown in FIG. 1 is shown in detail in FIG. 2, and is basically a ball screw device of the type substantially as disclosed in British Pat. No. 726,152. For this reason the device will be only briefly described herein, and for a full disclosure, reference should be made to the aforesaid Patent.

In this device, the nut 2 and screw 4 cooperate via a series of balls 11 which engage in a series of internal annular grooves or tracks 2a in the nut 2 and in an external screw thread or helical groove or track 4a in the screw 4. The balls 11 are confined in circumferentially spaced relation in individual slots 12a in a cage 12 arranged concentrically between the nut and screw. The engagement of the balls 11 in the annular tracks 2a effectively locks the cage 12 against any significant axial displacement relative to the nut 2.

With the cage 12 rotationally unrestrained, rotation of the nut 2 causes the balls 11 to roll along the annular and helical tracks 2a and 4a respectively, constrained by the cage 12 which also rotates, as fully explained in the said Patent, producing axial displacement of the non-rotatable screw 4 relative to the nut 2. However, if the cage is locked against rotation relative to the screw 4, rotation of the nut 2 merely causes the balls 11 to roll in the annular tracks 2a, allowing the nut to free-wheel or over-run relative to the cage and screw, without producing any axial displacement of the latter. In this condition, the screw 4 is locked against axial displacement relative to the cage and nut.

In the latter respect, the cage 12 is provided with a pair of circumferentially oppositely facing axially extending walls 13,14 at its ends, one of which 13 engages with a projecting peg 15 on the screw 4 at one end of the travel of the screw, at the same time as the right-hand end of the screw as seen in FIG. 1 operates a micro-switch 16 to enable control of (e.g. to disconnect) the supply of electricity to motor 7. The action of the peg 15 in contacting the axial wall 13 causes the cage 12 to cease to rotate, and therefore causes the screw 4 to cease to move axially relative to the nut 2, and allows the nut 2 to freewheel, as just described.

One problem which has been encountered in using such a ball screw device is that each type of vehicle or engine has a control mechanism having a different amount of travel between its fully open and fully closed positions, and accordingly the travel of the screw 4 relative to the nut 2 is desirably adjustable. This adjustment is provided by the mechanism embodying the present invention.

Non-rotatably secured to the right-hand end of the screw 4 as seen in FIG. 1 there is provided a block 17 which moves axially with the screw 4 within the housing 3, but which is constrained against rotation by the housing. This block serves to contact the micro-switch 16 when the peg 15 contacts the axial wall 13.

Figure 3:
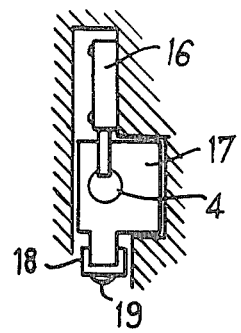
FIG. 3 is a fragmentary end elevation of the mechanism of FIG. 1, with parts broken away.
Figure 4:
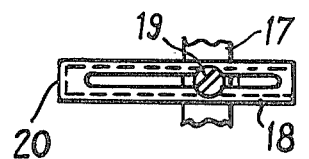
FIG. 4 is an underneath plan of the axially adjustable plate shown in FIGS. 1 and 3.

Adjustably secured to the block 17 is a channel-section arm or plate 18 (see also FIGS. 3 and 4) held by means of a screw 19, the plate 18 having an end surface 20 which is arranged to contact a second micro-switch 21, and also having a peg 22 which is arranged to contact the axial wall 14 of the cage 12 at the same time as the plate contacts the micro-switch 21. Thus, when screw 4 moves to the left from the position shown in FIG. 1 relative to nut 2 into its left-hand limit position, the nut 2 is caused to over-run or freewheel by the peg 22 contacting the wall 14, and simultaneously the supply to the motor 7 is controlled (e.g. cut off) by micro-switch 21.

It will be noted that the plate 18 can be adjusted, for example from position A2 to position A1 in FIG. 1, reducing the relative travel of the screw to the nut by this amount, but nevertheless the plate 18 causes the screw-and-nut device to over-run, i.e. free wheel, and operates the switch 21 simultaneously.

The operation of either micro-switch 16 or 21 need not stop the motor 7 immediately, but may, for example, do so through a delay circuit so that the nut over-runs the screw for a short time before the motor stops. Alternatively the micro-switches may reverse the motor. Moreover, the micro-switches 16, 21 may provide information that the screw has reached the end of its travel, for use elsewhere.

The speed responsive system with which the actuator mechanism herein described may be employed may, for example, be as disclosed in British Pat. No. 1386961 or 1486821, both in the name of Associated Engineering Limited.

We claim:

1. A road vehicle powered by an internal combustion engine, and fitted with a speed control system including an electronic control circuit operable to sense the speed of the vehicle and produce an output which varies in dependence upon a comparison between the actual speed of the vehicle and a selected speed, said output being applied to an actuator mechanism connected to displace a speed change device of the engine, the actuator mechanism comprising a screw-and-nut device including a housing, a nut member, rotatably mounted in the housing, a screw member slidable within the housing and disposed concentrically within the nut member, the nut member being rotatably driven by a reversible electric motor controlled by the output of the control circuit, a series of balls, a cage between the nut member and screw member and accommodating the balls, the cage having oppositely directed walls at its ends, extending in the general direction of the axis of rotation of the nut member, the balls co-operating with the cage, nut member and screw member so that rotation of the nut member produces generally axial displacement of the screw member via the balls during rotation of the cage relative to the screw member, whilst rotation of the nut member produces no axial displacement of the screw member when the cage is prevented from rotating relative to the screw member, the actuator mechanism further comprising a limit switch, operable to make and break the energising circuit of the motor, and positioned in axially stationary relation with said screw member, a block non-rotatably fixed to one end of the screw member within the housing, and bearing against, and constrained against rotation by, the housing, abutment means axially displaceable with the screw member, adjustable relative thereto, and arranged to engage a wall at one end of the cage, thereby to prevent rotation of the cage and thus prevent axial displacement of the screw member, substantially simultaneously with actuating the limit switch, at one end of the axial travel of the screw member, the abutment means comprising a plate adjustably mounted on the block and extending in a generally axial direction towards the nut member, the plate being provided with a peg arranged to engage the wall at said one end of the cage, a further switch associated with the other end of the axial travel of the screw member, means arranged to engage a wall at the other end of the cage, thereby to prevent rotation of the cage and axial displacement of the screw member, at the other end of the axial travel of the screw member, the screw member being connected to the displaceable speed change device of the engine to effect displacement of the speed change device, and the abutment means being adjustable axially relative to the screw member to adjust and extent of the axial travel of the latter to suit the amount of travel of the engine speed change device.

2. In an actuator mechanism, comprising a screw-and-nut device including a nut member, a scew member concentrically within the nut member, a reversible electric motor connected to rotatably drive the nut member, a series of balls, a cage between the nut member and screw member and accommodating the balls, the cage having oppositely directed first and second walls at its ends, extending in the general direction of the axis of rotation of the nut member, the balls cooperating with the cage, nut member and screw member so that rotation of the nut member produces generally axial displacement of the screw member via the balls during rotation of the cage relative to the screw member, whilst rotation of the nut member produces no axial displacement of the screw member when the cage is prevented from rotating relative to the screw member, first abutment means axially displaceable with the screw member and arranged to engage the first wall at one end of the cage, thereby to prevent rotation of the cage and thus prevent axial displacement of the screw member at one end of the axial travel of the screw member, and second abutment means comprising a radially directed projection carried by the screw member and arranged to engage the second wall at the other end of the cage, thereby to prevent rotation of the cage and axial displacement of the screw member, at the other end of the axial travel of the screw member, the improvement comprising:
- A. a housing, the nut member being mounted for rotational but not axial movement with respect to the housing, and the screw member being mounted for axial but not rotational movement with respect to the housing;
- B. an axially fixed limit switch associated with said one end of the axial travel of the screw member;
- C. a non-rotatable mounting member for the first abutment means, connected to the screw member for axial movement in unison therewith, but constrained against rotation by the housing;
- D. the first abutment means comprising an elongate member axially adjustably mounted on the mounting member and extending in an axial direction towards the nut member, the elongate member including a peg arranged to engage the wall at said one end of the cage, the elongate member being arranged to engage the first wall simultaneously with actuation of the limit switch;
- E. A further switch associated with the other end of the axial travel of the screw member; and
- F. means to connect the screw member to a displaceable control device of an engine to effect displacement of the control device;

the axial adjustment of the first abutment means relative to the screw member serving to adjust the extent of the axial travel of the screw member to suit engine control devices having differing amounts of travel.

3. A mechanism as claimed in claim 2 including means to actuate the further limit switch substantially simultaneously with the stopping of rotation of the cage at said other end of the axial travel of the screw member.

4. A mechanism as claimed in claim 3, wherein said non-rotatable mounting member for said first abutment means comprises a block fixed to said one end of the screw member within the housing, and wherein said further limit switch actuating means comprises said block.

5. A mechanism as claimed in claim 2, including an axially displaceable linkage arrangement connected at one end to the screw member, and adapted to be connected, remote from said one end, to an engine control device.

6. An actuator mechanism, comprising a screw-and-nut device including a housing, a nut member rotatably mounted in the housing, the nut member being adapted to be rotatably driven by a reversible electric motor, a screw member slidable within the housing and disposed concentrically within the nut member, a series of balls, a cage between the nut member and screw member and accommodating the balls, the cage having oppositely directed walls at its ends, extending in the general direction of the axis of rotation of the nut member, the balls cooperating with the cage, nut member and screw member so that rotation of the nut member produces generally axial displacement of the screw member via the balls during rotation of the cage relative to the screw member, whilst rotation of the nut member produces no axial displacement of the screw member when the cage is prevented from rotating relative to the screw member, the actuator mechanism further comprising a limit switch positioned in axially stationary relation with said screw member, a block non-rotatably fixed to one end of the screw member within the housing, and bearing against, and constrained against rotation by, the housing, abutment means axially displaceable with the screw member, adjustable relative thereto, and arranged to engage a wall at one end of the cage, thereby to prevent rotation of the cage and thus prevent axial displacement of the screw member, substantially simultaneously with actuating the limit switch, at one end of the axial travel of the screw member, the abutment means comprising a plate adjustably mounted on the block and extending in a generally axial direction towards the nut member, the plate being provided with a peg arranged to engage the wall at said one end of the cage, a further switch associated with the other end of the axial travel of the screw member, means arranged to engage a wall at the other end of the cage, thereby to prevent rotation of the cage and axial displacement of the screw member, at the other end of the axial travel of the screw member, the screw member being adapted to be connected to a displaceable control device of an engine to effect displacement of the control device, and the abutment means being adjustable axially relative to the screw member to adjust the extent of the axial travel of the latter to suit engine control devices having differing amounts of travel.

* * * * *